(12) United States Patent
Garde

(10) Patent No.: US 6,510,510 B1
(45) Date of Patent: Jan. 21, 2003

(54) DIGITAL SIGNAL PROCESSOR HAVING DISTRIBUTED REGISTER FILE

(75) Inventor: Douglas Garde, Dover, MA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 09/218,346

(22) Filed: Dec. 22, 1998

Related U.S. Application Data

(63) Continuation-in-part of application No. 08/591,137, filed on Jan. 25, 1996, now Pat. No. 5,954,811.

(51) Int. Cl.[7] .............................................. G06F 15/00
(52) U.S. Cl. ........................................ 712/218; 712/35
(58) Field of Search ................................. 712/35, 218

(56) References Cited

U.S. PATENT DOCUMENTS

| 4,811,296 A | 3/1989 | Garde | 365/189 |
|---|---|---|---|
| 4,873,704 A * | 10/1989 | Randall | 377/47 |
| 5,111,431 A | 5/1992 | Garde | 365/129.02 |
| 5,555,432 A * | 9/1996 | Hinton et al. | 395/800 |
| 5,617,345 A * | 4/1997 | Kamijo | 364/754 |
| 5,954,811 A * | 9/1999 | Garde | 712/35 |

* cited by examiner

*Primary Examiner*—John A. Follansbee
(74) *Attorney, Agent, or Firm*—Wolf, Greenfield & Sacks, P.C.

(57) ABSTRACT

A computation block for use in a digital signal processor includes a register file for storage of operands and results and one or more computation units for executing digital signal computations. A first digital signal computation is performed with one of the computation units, and an intermediate result is produced. The intermediate result is transferred from a result output of the computation unit to an intermediate result input of one or more of the computation units without first transferring the intermediate result to the register file. A second digital signal computation is performed using the intermediate result to produce a final result or a second intermediate result.

17 Claims, 4 Drawing Sheets

DIGITAL SIGNAL PROCESSOR HAVING DISTRIBUTED REGISTER FILE

CROSS-REFERENCE TO RELATED APPLICATION

This application is a continuation-in-part of Application Ser. No. 08/591,137, filed Jan. 25, 1996 now U.S. Pat. No. 5,954,811.

FIELD OF THE INVENTION

This invention relates to digital signal processors and, more particularly, to a digital signal processor having a computation block architecture that facilitates high speed digital signal computations.

BACKGROUND OF THE INVENTION

A digital signal computer, or digital signal processor (DSP), is a special purpose computer that is designed to optimize performance for digital signal processing applications, such as, for example, fast Fourier transforms, digital filters, image processing and speech recognition. Digital signal processor applications are typically characterized by real time operation, high interrupt rates and intensive numeric computations. In addition, digital signal processor applications tend to be intensive in memory access operations and to require the input and output of large quantities of data. Thus, designs of digital signal processors may be quite different from those of general purpose computers.

One approach that has been used in the architecture of digital signal processors to achieve high speed numeric computation is the Harvard architecture, which utilizes separate, independent program and data memories so that the two memories may be accessed simultaneously. This architecture permits an instruction and an operand to be fetched from memory in a single clock cycle. Frequently, the program occupies less memory space than the operands for the program. To achieve full memory utilization, a modified Harvard architecture utilizes the program memory for storing both instructions and operands. Typically, the program and data memories are interconnected with the core processor by separate program and data buses.

The core processor of a digital signal processor typically includes a computation block, a program sequencer, an instruction decoder and all other elements required for performing digital signal computations. The computation block is the basic computation element of the digital signal processor and typically includes one or more computation units, such as a multiplier and an arithmetic logic unit (ALU), and a register file. The register file receives operands from memory and supplies the operands to the computation units for use in the digital signal computations. The results of the digital signal computations are returned by the computation units to the register file for temporary storage. Final results are written to memory, and intermediate results are forwarded by the register file to one or more of the computation units for further computation.

Digital signal computations are frequently repetitive in nature. That is, the same or similar computations may be performed multiple times with different operands. Thus, any increase in the speed of individual computations is likely to provide significant enhancements in the performance of the digital signal processor.

Multiport register files which support flow-through of data, wherein data presented at an input port of the register file during a given clock cycle can be passed to an output port of the register file in the same cycle, are disclosed in U.S. Pat. No. 4,811,296, issued Mar. 7, 1989 to Garde and U.S. Pat. No. 5,111,431, issued May 5, 1992 to Garde. While the disclosed multiport register files exhibit generally satisfactory performance, it is desirable to provide computation block architectures with further performance enhancements.

SUMMARY OF THE INVENTION

According to a first aspect of the invention, a computation block for performing digital signal computations is provided. The computation block comprises a register file for storage of operands and results of the digital signal computations, first and second computation units for executing the digital signal computations using the operands and producing the results, one or more operand buses each coupled between an operand output of the register file and an operand input of the first and second computation units, and one or more result buses each coupled to a result output of the first and second computation units, to an intermediate result input of the first and second computation units and to a result input of the register file. An intermediate result of the digital signal computation may be transferred directly from the result output of one of the computation units to the intermediate result inputs of one or both of the first and second computation units for use in a subsequent computation without first transferring the intermediate result to the register file.

The first computation unit may comprise a multiplier for performing multiplication operations, and the second computation unit may comprise an ALU for performing arithmetic operations. The computation block may further include a third computation unit comprising a shifter for performing shifting operations. In a preferred embodiment, the computation block comprises two or more result buses each coupled to result outputs of one or more of the first and second computation units, to the intermediate result inputs of the first and second computation units and to result inputs of the register file.

Each computation unit may comprise a first latch coupled to the operand bus and the result bus, a first multiplexer having inputs coupled to the first latch, a second latch having inputs coupled to the operand bus and the result bus, a second multiplexer having inputs coupled to the second latch, a computation circuit receiving first and second operands from the first and second multiplexers, and an output latch having an input coupled to the computation circuit and having an output coupled to the result bus. The register file may comprise a plurality of registers, an operand latch having an input coupled to the registers and an output coupled to the operand bus and a result latch having an input coupled to the result bus and an output coupled to the registers.

According to a further aspect of the invention, a method is provided for operating a computation block that performs digital signal computations, the computation block comprising a register file for storage of operands and results and first and second computation units for executing the digital signal computations. A first digital signal computation is performed with the first computation unit, and an intermediate result is produced. The intermediate result is transferred from a result output of the first computation unit to an intermediate result input of the second computation unit without first transferring the intermediate result to the register file. A second digital signal computation is performed by the second computation unit using the intermediate result to produce a final result or a second intermediate result.

The intermediate result may be transferred from the result output of the first computation unit to an intermediate result input of the first computation unit without first transferring the intermediate result to the register file. The intermediate result may be used by the first computation unit to perform a third digital signal computation.

According to a further aspect of the invention, a computation block for performing digital signal computations is provided. The computation block comprises first and second computation units for executing the digital signal computations and a distributed register file for storage of operands and results of the digital signal computations. The distributed register file comprises a central register file portion coupled to the first and second computation units by one or more operands buses and by one or more result buses, and first and second local register file portions respectively associated with the first and second computation units. An intermediate result produced by one of the computation units may be transferred to the local portions of the distributed register file for use in subsequent digital signal computations without first transferring the intermediate result to the central portion of the distributed register file.

BRIEF DESCRIPTION OF THE DRAWINGS

For a better understanding of the present invention, reference is made to the accompanying drawings, which are incorporated herein by reference in which.

DETAILED DESCRIPTION

Figure 1:
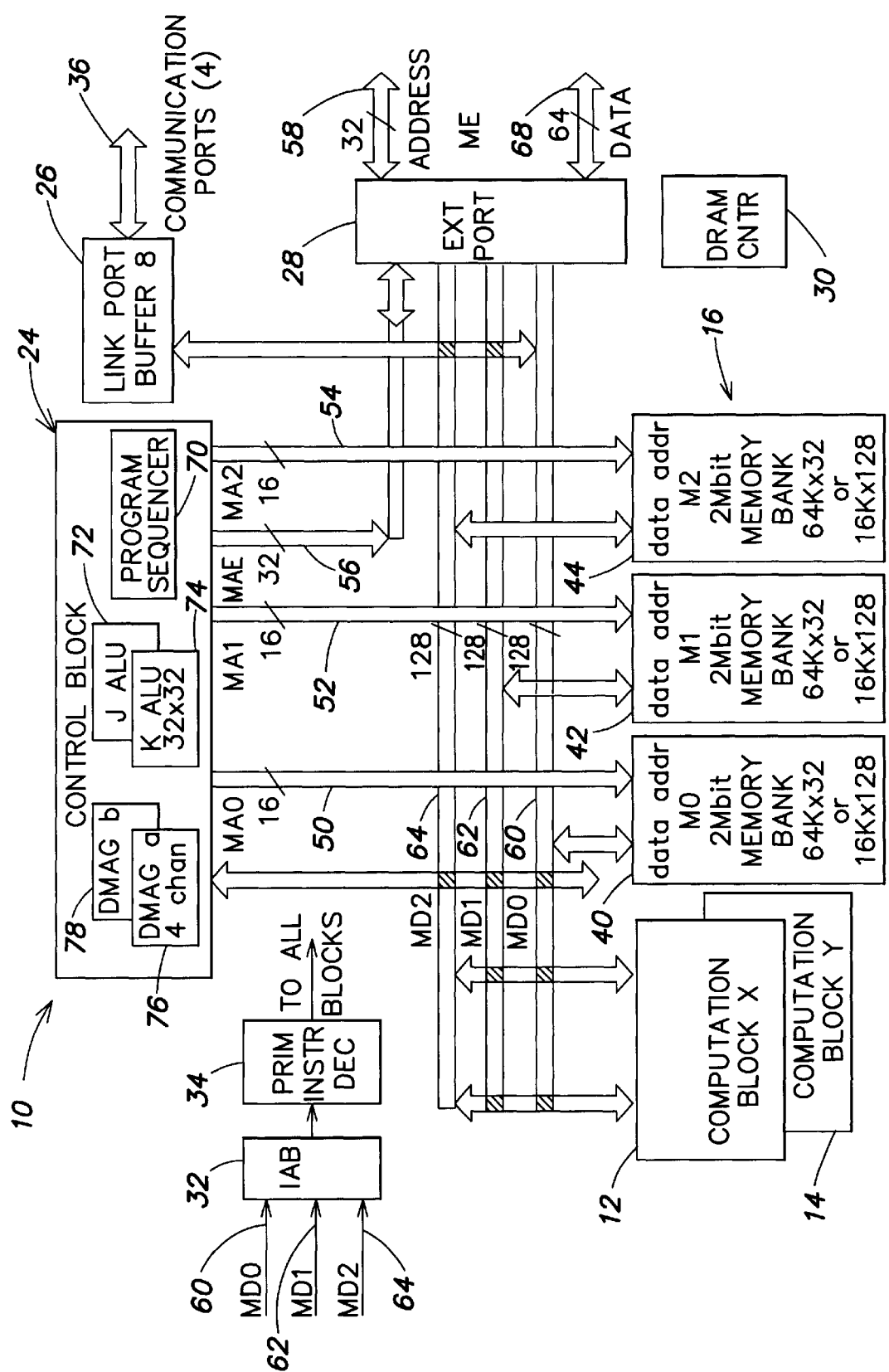
FIG. 1 is a block diagram of an example of a digital signal processor suitable for incorporation of the present invention.

A block diagram of a digital signal processor (DSP) 10 in accordance with the present invention is shown in FIG. 1. The principal components of DSP 10 are computation blocks 12 and 14, a memory 16, a control block 24, link port buffers 26, an external port 28, a DRAM controller 30, an instruction alignment buffer (IAB) 32 and a primary instruction decoder 34. The computation blocks 12 and 14, the instruction alignment buffer 32, the primary instruction decoder 34 and the control block 24 constitute a core processor which performs the main computation and data processing functions of the DSP 10. The external port 28 controls external communications via an external address bus 58 and an external data bus 68. The link port buffers 26 control external communication via communication ports 36. The DSP is preferably configured as a single monolithic integrated circuit and is preferably fabricated using a 0.35 micron gate, four metal, SRAM CMOS process. In a preferred embodiment, an external clock (not shown) at a frequency of 41.5 MHZ is internally multiplied by four to provide an internal clock at 166 MHZ.

The memory 16 includes three independent, large capacity memory banks 40, 42 and 44. In a preferred embodiment, each of the memory banks 40, 42 and 44 has a capacity of 64K words of 32 bits each. As discussed below, each of the memory banks 40, 42 and 44 preferably has a 128 bit data bus. Up to four consecutive aligned data words of 32 bits each can be transferred to or from each memory bank in a single clock cycle.

The elements of the DSP 10 are interconnected by buses for efficient, high speed operation. Each of the buses includes multiple lines for parallel transfer of binary information. A first address bus 50 (MA0) interconnects memory bank 40 (M0) and control block 24. A second address bus 52 (MA1) interconnects memory bank 42 (M1) and control block 24. A third address bus 54 (MA2) interconnects memory bank 44 (M2) and control block 24. Each of the address buses 50, 52 and 54 is preferably 16-bits wide. An external address bus 56 (MAE) interconnects external port 28 and control block 24. The external address bus 56 is interconnected through external port 28 to external address bus 58. Each of the external address buses 56 and 58 is preferably 32 bits wide. A first data bus 60 (MD0) interconnects memory bank 40, computation blocks 12 and 14, control block 24, link port buffers 26, IAB 32 and external port 28. A second data bus 62 (MD1) interconnects memory bank 42, computation blocks 12 and 14, control block 24, link port buffers 26, IAB 32 and external port 28. A third data bus 64 (MD2) interconnects memory bank 44, computation blocks 12 and 14, control block 24, link port buffers 26, IAB 32 and external port 28. The data buses 60, 62 and 64 are connected through external port 28 to external data bus 68. Each of the data buses 60, 62 and 64 is preferably 128 bits wide, and external data bus 68 is preferably 64 bits wide.

The first address bus 50 and the first data bus 60 comprise a bus for transfer of data to and from memory bank 40. The second address bus 52 and the second data bus 62 comprise a second bus for transfer of data to and from memory bank 42. The third address bus 54 and the third data bus 64 comprise a third bus for transfer of data to and from memory bank 44. Since each of the memory banks 40, 42 and 44 has a separate bus, the memory banks 40, 42 and 44 may be accessed simultaneously. As used herein, "data" refers to binary words, which may represent either instructions or operands that are associated with the operation of the DSP 10. In a typical operating mode, program instructions are stored in one of the memory banks, and operands are stored in the other two memory banks. Thus, at least one instruction and two operands can be provided to computation blocks 12 and 14 in a single clock cycle. As described below, each of the memory banks 40, 42, and 44 is configured to permit reading and writing of multiple data words in a single clock cycle. The simultaneous transfer of multiple data words from each memory bank in a single clock cycle is accomplished without requiring an instruction cache or a data cache.

The control block 24 includes a program sequencer 70, a first integer ALU 72 (J ALU), a second integer ALU 74 (K ALU), a first DMA address generator 76 (DMAG A) and a second DMA address generator 78 (DMAG B). The integer ALU's 72 and 74, at different times, execute integer ALU instructions and perform data address generation. During execution of a program, the program sequencer 70 supplies a sequence of instruction addresses on one of the address buses 50, 52, 54 and 56, depending on the memory location of the instruction sequence. Typically, one of the memory banks 40, 42 or 44 is used for storage of the instruction sequence. Each of the integer ALU's 72 and 74 supplies a data address on one of the address buses 50, 52, 54 and 56, depending on the location of the operand required by the instruction. Assume, for example, that an instruction sequence is stored in memory bank 40 and that the required operands are stored in memory banks 42 and 44. In this case, the program sequencer supplies instruction addresses on address bus 50 and the accessed instructions are supplied to the instruction alignment buffer 32, as described below. The integer ALU's 72 and 74 may, for example, output addresses of operands on address buses 52 and 54, respectively. In response to the addresses generated by integer ALU's 72 and 74, the memory banks 42 and 44 supply operands on data buses 62 and 64, respectively, to either or both of the computation blocks 12 and 14. The memory banks 40, 42 and 44 are interchangeable with respect to storage of instructions and operands.

The program sequencer 70 and the integer ALU's 72 and 74 may access an external memory (not shown) via external port 28. The desired external memory address is placed on address bus 56. The external address is coupled through external port 28 to external address bus 58. The external memory supplies the requested data word or data words on external data bus 68. The external data is supplied via external port 28 and one of the data buses 60, 62 and 64 to one or both of computation blocks 12 and 14. The DRAM controller 30 controls the external memory.

As indicated above, each of the memory banks 40, 42 and 44 preferably has a capacity of 64k words of 32 bits each. Each memory bank may be connected to a data bus that is 128 bits wide. In an alternative embodiment, each data bus may be 64 bits wide, and 64 bits are transferred on each of clock phase 1 and clock phase 2, thus providing an effective bus width of 128 bits. Multiple data words can be accessed in each memory bank in a single clock cycle. Specifically, data can be accessed as single, dual or quad words of 32 bits each. Dual and quad accesses require the data to be aligned in memory. Typical applications for quad data accesses are the fast Fourier transform (FFT) and complex FIR filters. Quad accesses also assist double precision operations. Preferably, instructions are accessed as quad words. However, instructions are not required to be aligned in memory.

Using quad word transfers, four instructions and eight operands, each of 32 bits, can be supplied to the computation blocks 12 and 14 in a single clock cycle. The number of data words transferred and the computation block or blocks to which the data words are transferred are selected by control bits in the instruction. The single, dual, or quad data words can be transferred to computation block 12, to computation block 14, or to both. Dual and quad data word accesses improve the performance of the DSP 10 in many applications by allowing several operands to be transferred to the computation blocks 12 and 14 in a single clock cycle. The ability to access multiple instructions in each clock cycle allows multiple operations to be executed in each cycle, thereby improving performance. If operands can be supplied faster than they are needed by the computation blocks 12 and 14, then there are memory cycles left over that can be used by the DMA address generators 76 and 78 to provide new data to the memory banks 40, 42 and 44 during those unused cycles, without stealing cycles from the core processor. Finally, the ability to access multiple data words makes it possible to utilize two or more computation blocks and to keep them supplied with operands. The ability to access single or dual data words reduces power consumption in comparison with a configuration where only quad data words are accessed.

Figure 2:
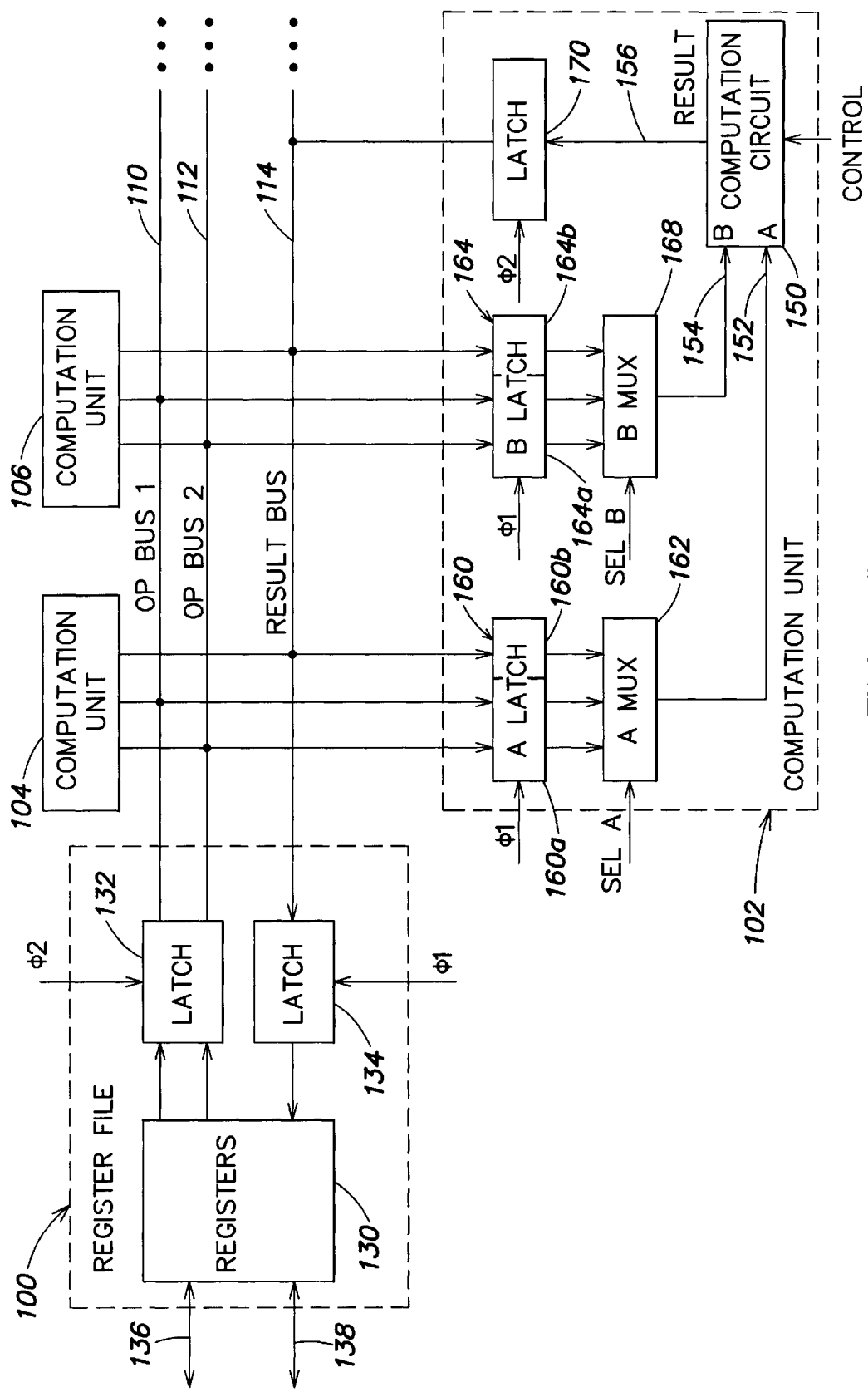
FIG. 2 is a simplified block diagram of an example of a computation block in accordance with the present invention.

A simplified block diagram of an example of a computation block in accordance with the invention is shown in FIG. 2. The computation block includes a register file 100 and computation units 102, 104 and 106. The computation block may include one or more computation units. Computation units 104 and 106 may have the same structure as computation unit 102 and may be configured to perform the same or different operations. Register file 100 and computation units 102, 104 and 106 may be interconnected by an operand bus 110, an operand bus 112, and a result bus 114.

Register file 100 may include registers 130 for temporary storage of operands and results, an operand latch 132, and a result latch 134. Registers 130 may be connected to memory 16 (FIG. 1) by one or more memory buses 136, 138. Operands for the computations are transferred from memory 16 to registers 130, and results of the computations are transferred from registers 130 to memory. Operand latch 132 receives inputs from registers 130 and supplies outputs via operand outputs of the register file to operand buses 110 and 112. Result latch 134 has inputs connected via a result input of the register file 100 to result bus 114 and has an output connected to registers 130.

Computation unit 102 includes a computation circuit 150 which may perform computations such as multiplication, arithmetic operations, and the like. Computation circuit 150 receives A and B operands on buses 152 and 154, respectively, and produces a result on a bus 156. Computation circuit 150 is controlled by signals from an instruction decoder (not shown). Computation unit 102 further includes an A latch 160, an A multiplexer 162, a B latch 164 and a B multiplexer 168. The A latch 160 includes an operand latch 160a having operand inputs coupled to operand buses 110 and 112, and an intermediate result latch 160b having intermediate result inputs coupled to result bus 114. The outputs of latch 160 are supplied to the data inputs of multiplexer 162. Multiplexer 162 supplies inputs from bus 110, bus 112 or bus 114 to computation circuit 150 as operand A in response to a select A signal. Similarly, B latch 164 includes an operand latch 164a having operand inputs coupled to operand buses 110 and 112, and an intermediate result latch 164b having intermediate result inputs coupled to result bus 114. The outputs of latch 164 are coupled to the data inputs of multiplexer 168. Multiplexer 168 supplies inputs from bus 110, bus 112 or bus 114 to computation circuit 150 as operand B in response to a select B signal. Computation unit 102 further includes an output latch 170 having inputs connected to the result output of computation circuit 150. The outputs of latch 170 are connected via result outputs of computation unit 102 to result bus 114.

Latches 132, 134, 160, 164 and 170 may be controlled by a two-phase system clock to ensure proper transfer of data. In particular, latches 134, 160 and 164 may be latched on phase 1, $\phi 1$, of the system clock, and latches 132 and 170 may be latched on phase 2, $\phi 2$, of the system clock.

In operation, register file 100 receives operands for performing a digital signal computation from memory 16 and temporarily stores the operands in registers 130. The operands are output via latch 132 on operand buses 110 and 112 and are held in operand latches 160a and 164a. The appropriate operands are selected by multiplexer 162 and 168 in response to select A and select B signals received from the instruction decoder. The computation circuit 150 performs the desired digital signal computation and outputs a result on result bus 114 via latch 170. The result may be a final result or may be an intermediate result in a series of computations. A final result may be returned to registers 130 via latch 134.

An intermediate result may be required by one or more of the computation units 102, 104 and 106 in a subsequent computation. The intermediate result is held in intermediate result latches 160b and 164b in each of the computation units 102, 104 and 106. The intermediate result may be selected by the appropriate multiplexer 162 or 168 from the respective intermediate result latch 160b or 164b in one or more of the computation units. Because the result bus 114 is connected to intermediate result inputs of the computation units 102, 104 and 106, the intermediate result may be obtained by the computation units without first transferring the intermediate result to register file 100, followed by register file 100 returning the intermediate result to the computation units as an operand. This configuration provides a significant improvement in performance in comparison with prior art computation blocks which require return of the intermediate result to the register file. It will be understood that the computation block may include any desired number of operand buses and any desired number of result buses for enhanced performance.

The computation block of FIG. 2 may be viewed as having a distributed register file configuration. That is, the register file functions of the computation block are performed in part by a centralized portion (register file 100) and in part by local portions associated with each computation unit. In computation unit 102, the intermediate result latches 160*b* and 164*b*, which receive intermediate results from result bus 114, constitute the local portions of the distributed register file. Other computation units in the computation block may include local portions of the distributed register file. The distributed register file configuration provides enhanced performance in comparison with prior art computation blocks having a centralized register file configuration.

Figure 3:
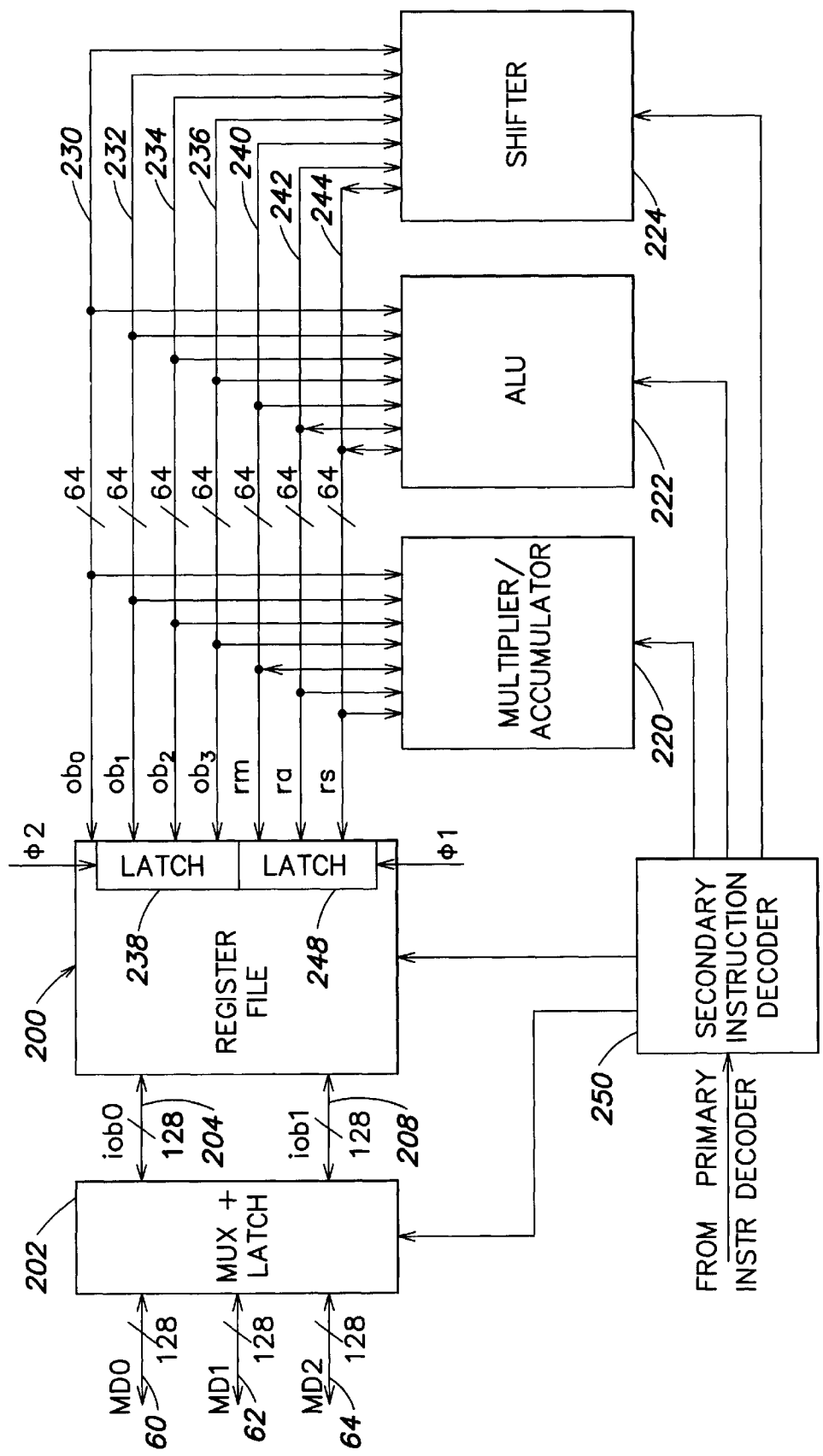
FIG. 3 is a block diagram representative of each computation block shown in FIG. 1.

A block diagram of an exemplary embodiment of each of the computation blocks 12 and 14 (FIG. 1) is shown in FIG. 3. A multiple port register file 200 provides temporary storage for operands and results. In a preferred embodiment, the register file 200 has a capacity of 32 words of 32 bits each, organized as 8 rows of 128 bits each. The register file 200 is connected through a multiplexer and latch 202 to each of the data buses 60, 62 and 64. When operands are fetched from memory 16, two of the three data buses are selected, and the operands on the selected buses are supplied to the register file 200 on a bus 204 (iob0) and a bus 208 (iob1), each of which is 128 bits wide. When data is being written from the register file 200 to memory 16 or to an external memory, the data is supplied to multiplexer and latch 202 on buses 204 and 208. The output data on buses 204 and 208 is switched by multiplexer and latch 202 to selected ones of the data buses 60, 62 and 64 for writing to memory. In addition to selecting two of the three data buses 60, 62 and 64, the multiplexer and latch 202 permits word selection within each bus under instruction control. In the case of single word transfers, the multiplexer and latch 202 may or may not select the accessed data word. In the case of dual word transfers, the multiplexer and latch 202 may select either or both data words. In the case of quad word transfers, the multiplexer and latch 202 may select different combinations of dual data words or may select the entire quad data word.

The computation block shown in FIG. 3 has three computation units, including a multiplier/accumulator 220, an arithmetic logic unit (ALU) 222 and a shifter 224. The multiplier/accumulator 220, the ALU 222 and the shifter 224 are capable of simultaneous execution of instructions to the extent that sufficient instructions and operands can be supplied to the computation block. Operands are supplied from the register file 200 to multiplier/accumulator 220, ALU 222 and shifter 224 on four operand buses 230 (ob0), 232 (ob1), 234 (ob2) and 236 (ob3). Each of the operand buses 230, 232, 234 and 236 is 64 bits wide. Register file 200 includes an operand latch 238 for temporarily holding the operands that are transmitted on operand buses 230, 232, 234 and 236. Operand latch 238 may be controlled by phase 2, φ2, of the system clock.

Results from the multiplier/accumulator 220 are returned to the register file 200 on a result bus 240(*rm*). Results from the ALU 222 are returned to the register file 200 on a result bus 242(*ra*) and a result bus 244(*rs*). Results from the shifter 224 are returned to the register file 200 on result bus 244. The result buses 240, 242 and 244 are connected to each of the computation units, including multiplier/accumulator 220, ALU 222 and shifter 224, so that each computation unit can obtain intermediate results directly from the result buses 240, 242 and 244 as operands for subsequent computations. Each of the result buses 240, 242 and 244 is preferably 64 bits wide. Register file 200 includes a result latch 248 for temporarily holding results that are transmitted on result buses 240, 242 and 244. Result latch 248 may be controlled by phase 1, φ1, of the system clock.

Addressing of the register file 200 and control signals for the multiplexer and latch 202, multiplier/accumulator 220, ALU 222 and shifter 224 are provided from a secondary instruction decoder 250. The secondary instruction decoder 250 decodes instructions supplied from the primary instruction decoder 34 (FIG. 1). Each of the two computation blocks 12 and 14 may execute up to three instructions in the same clock cycle, one each for the multiplier/accumulator 220, the ALU 222 and the shifter 224.

In the architecture illustrated in FIG. 1, the instruction alignment buffer 32 and the primary instructor decoder 34 are centralized. Instructions fetched from one of the memory banks 40, 42 and 44 are supplied to instruction alignment buffer 32 on one of the data buses 60, 62 and 64. The instructions are aligned for execution in the clock cycle required by the instruction sequence and are partially decoded by the primary instruction decoder 34. The partially decoded instructions are supplied to the appropriate block in the DSP 10. For example, the instructions may be supplied to one or both of the computation blocks 12 and 14 or to the control block 24. Decoding of the instruction is completed by the block which utilizes the instruction. For example, as shown in FIG. 3, the secondary instruction decoder 250 completes decoding of computation instructions.

Figure 4:
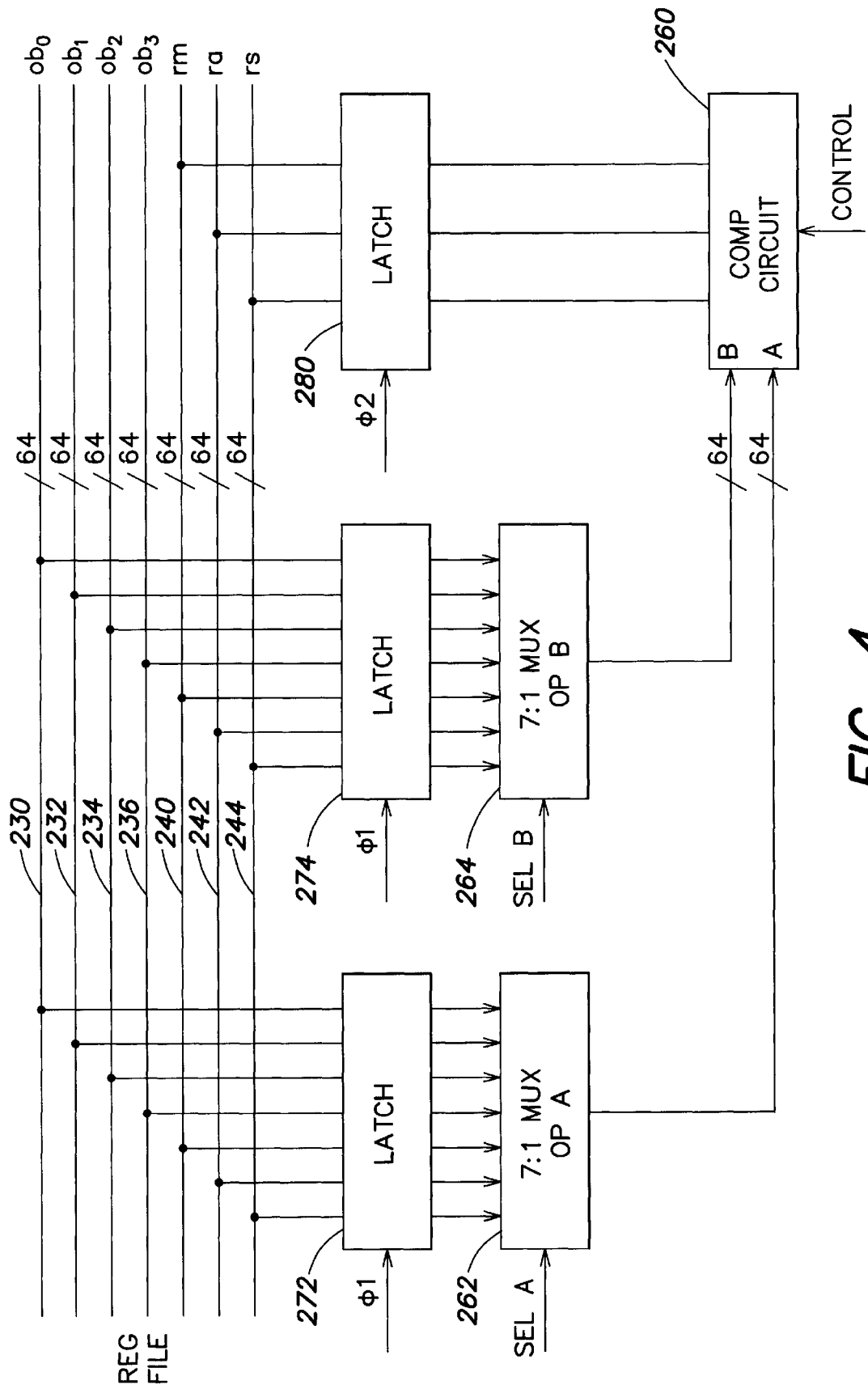
FIG. 4 is a block diagram representative of each computation unit shown in FIG. 3.

The multiplier/accumulator 220, ALU 222 and shifter 224 are the computation units of the computation block. A block diagram representative of each computation unit is shown in FIG. 4. Each computation unit includes a computation circuit 260 that receives operand A from a multiplexer 262 and operand B from a multiplexer 264. A latch 272 has inputs coupled to operand buses 230, 232, 234 and 236 and to result buses 240, 242 and 244. The outputs of latch 272 are coupled to the respective inputs of multiplexer 262. A latch 274 has inputs coupled to operand buses 230, 232, 234 and 236 and to result buses 240, 242 and 244. The outputs of latch 274 are coupled to the respective inputs of multiplexer 264. Latches 272 and 274 may be controlled by phase 1, φ1, of the system clock.

Multiplexer 262 selects operand A from one of the outputs of latch 272. Similarly, multiplexer 264 selects operand B from one of the outputs of latch 274. Thus, each of operands A and B may be an operand supplied by register file 200 or an intermediate result supplied by the same computation unit or a different computation unit in the computation block. Each of the operands supplied to computation circuit 260 may be 64 bits wide. The computation circuit 260 receives control signals from secondary instruction decoder 250 (FIG. 3) and supplies results on its outputs.

The outputs of computation circuit 260 are coupled to inputs of a latch 280. The outputs of latch 280 are coupled to result buses 240, 242 and 244. Latch 280 may be controlled by phase 2, φ2, of the system clock. The results output by computation circuit 260 may be final results of a digital signal computation or may be intermediate results that are required by one or more of the computation units, including the same computation unit, for completing the digital signal computation. The configuration shown in FIG. 4 has the advantage that each computation unit can obtain intermediate results directly from the result buses 240, 242 and 244 as operands without requiring the intermediate results to be first returned to the register file 200.

In high speed digital signal processors, it is desirable to operate the computation block as fast as possible, typically at cycle times on the order of 3 to 5 nanoseconds. Physical design constraints may dictate that the register file 200 and the computation units 220, 222 and 224 be physically separated on the integrated circuit chip. The computation block configuration shown in FIGS. 2–4 and described above may result in improvements in cycle times on the order of 0.5 to 1 nanosecond in comparison with configurations which require returning intermediate results to the register file. The present invention thereby provides a substantial improvement in performance.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A computation block for performing digital signal computations, comprising:
   a register file for storage of operands and results of said digital signal computations;
   first and second computation units for executing said digital signal computations using said operands and producing said results;
   one or more operand buses each coupled between an operand output of said register file and an operand input of said first and second computation units; and
   one or more result buses each coupled to a result output of said first and second computation units, to an intermediate result input of said first and second computation units and to a result input of said register file, wherein an intermediate result of a digital signal computation may be transferred directly from the result output of one of said computation units to the intermediate result inputs of one or both of said first and second computation units for use in a subsequent computation without first transferring the intermediate result to said register file, wherein each of said computation units comprises a first latch having inputs coupled to each of said operand buses and each of said result buses, a first multiplexer having inputs coupled to said first latch for selecting a first operand from one of said operand buses or one of said result buses in response to a first control signal, a second latch having inputs coupled to each of said operand buses and each said result buses, a second multiplexer having inputs coupled to said second latch for selecting a second operand from one of said operand buses or one of said result buses in response to a second control signal, a computation circuit for receiving said first and second operands and executing said digital signal computation, and an output latch having an input coupled to said computation circuit and an output coupled to one or more of said result buses.

2. A computation block as defined in claim 1 wherein said first computation unit comprises a multiplier for performing multiplication operations and said second computation unit comprises an ALU for performing arithmetic operations.

3. A computation block as defined in claim 2 further comprising a third computation unit, wherein each of said operand buses is coupled to an operand input of said third computation unit and wherein said result bus is coupled to a result output and an intermediate result input of said third computation unit, said third computation unit comprising a shifter for performing shifting operations.

4. A computation block as defined in claim 1 wherein said register file comprises a plurality of registers, an operand latch having inputs coupled to said registers and outputs coupled to each of said operand buses, and a result latch having inputs coupled to each of said result buses and outputs coupled to said registers.

5. A computation block as defined in claim 4 wherein the first and second latches in each of said computation units and the result latch in said register file are controlled in response to a first phase of a system clock and wherein the operand latch in said register file and the output latch in each of said computation units are controlled in response to a second phase of the system clock.

6. A computation block as defined in claim 1 comprising two or more result buses each coupled to the result outputs of one or more of said first and second computation units, to the intermediate result inputs of said first and second computation units and to the result inputs of said register file.

7. The computation block of claim 1, wherein the first and second latches of the first computation unit constitute a first local portion of the register file and the first and second latches of the second computation unit constitute a second local portion of the register file.

8. The computation block of claim 1, wherein the first latch comprises a first operand latch and a first intermediate result latch.

9. The computation block of claim 1, wherein the second latch comprises a second operand latch and a second intermediate result latch.

10. A computation block for performing digital signal computations, comprising:
   a register file for storage of operands and results of said digital signal computations, said register file having an operand output and a result input;
   at least one computation unit for executing said digital signal computations using said operands and producing said results, said computation unit having an operand input, an intermediate result input and a result output;
   at least one operand bus coupled between the operand output of said register file and the operand input of said computation unit; and
   at least one result bus coupled to the result output of said computation unit, to the intermediate result input of said computation unit and to the result input of said register file, wherein an intermediate result of a digital signal computation may be transferred directly from the result output of said computation unit to the intermediate result input of said computation unit for use in a subsequent computation without first transferring the intermediate result to said register file, wherein said computation unit comprises a first latch coupled to said operand bus and said result bus, a first multiplexer having inputs coupled to said first latch for selecting a first operand from said operand bus or said result bus in response to a first control signal, a second latch having inputs coupled to said operand bus and said result bus, a second multiplexer having inputs coupled to said second latch for selecting a second operand from said operand bus or said result bus in response to a second control signal, a computation circuit receiving said first and second operands from said first and second multiplexers, respectively, and an output latch having an input coupled to said computation circuit and having an output coupled to said result bus.

11. A computation block as defined in claim 10 wherein said register file comprises a plurality of registers, an operand latch having an input coupled to said registers and an output coupled to said operand bus, and a result latch having an input coupled to said result bus and an output coupled to said registers.

12. A computation block as defined in claim 11 wherein said first and second latches and said result latch are controlled in response to a first phase of a system clock and wherein the operand latch in said register file and the output latch in said computation unit are controlled in response to a second phase of the system clock.

13. A computation unit for performing digital signal computations, comprising:

a computation circuit having a first input for receiving a first operand used in digital signal computations and a second input for receiving a second operand used in digital signal computations;

a first operand latch having an input coupled to at least one operand bus for storing operands passed on the at least one operand bus from an external register file;

a first intermediate result latch having an input coupled to at least one result bus for storing operands from the at least one result bus;

a second operand latch having an input to coupled to the at least one operand bus for storing operands passed on the at least one operand bus from the external register file;

a second intermediate result latch having an input coupled to the at least one result bus for storing operands from the at least one result bus;

a first multiplexer for selecting a first operand from one of the first operand latch and first intermediate result latch and supplying the first operand to the first input of the computation circuit; and a second multiplexer for selecting a second operand from one of the second operand latch and second intermediate result latch and supplying the second operand to the second input of the computation circuit.

14. The computation unit of claim 13, further comprising a result latch coupled between the computation circuit and the at least one result bus for passing results output by the computation circuit to the at least one result bus.

15. The computation unit of claim 14, wherein the operand stored by the first intermediate result latch is passed to the at least one result bus by the result latch.

16. The computation unit of claim 14, wherein the operand stored by the first intermediate result latch is passed to the at least one result bus by a second computation unit.

17. The computation unit of claim 13, wherein the first and second intermediate result latches constitute a local portion of a distributed register file associated with the computation unit.

* * * * *